(No Model.)
T. S. VERY.
TOE CALK FOR HORSESHOES.
No. 481,336. Patented Aug. 23, 1892.
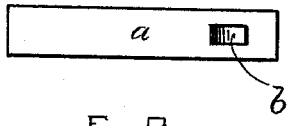
Fig. 1.
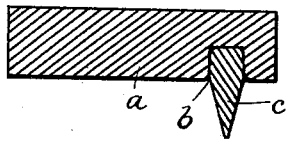
Fig. 2.
Fig. 3.
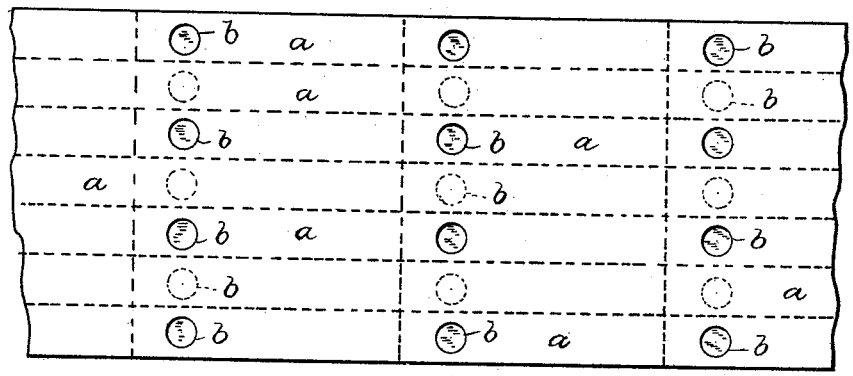
Fig. 4. Fig. 5. Fig. 6.
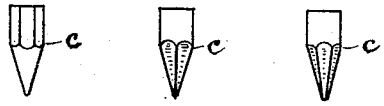
WITNESSES:
Ewing W. Hamlen.
A. D. Harrison.
INVENTOR
T. S. Very
by Wright Brown Quimby
Attys.

UNITED STATES PATENT OFFICE.

THEODORE S. VERY, OF BOSTON, MASSACHUSETTS.

TOE-CALK FOR HORSESHOES.

SPECIFICATION forming part of Letters Patent No. 481,336, dated August 23, 1892.

Application filed May 8, 1891. Serial No. 392,016. (No model.)

*To all whom it may concern:*

Be it known that I, THEODORE S. VERY, of Boston, in the county of Suffolk and State of Massachusetts, have invented certain new and useful Improvements in Spurred Toe-Calks and the Method of Making the Same, of which the following is a specification.

This invention relates to calks for horseshoes; and it has for its object to provide an improved calk and an improved spur therefor which is adapted to be attached to the calk and to be driven into the shoe without bending or breaking.

The invention consists in the calk, as hereinafter described and claimed.

In the accompanying drawings, forming a part of this specification, Figure 1 represents a top plan view of a calk having a recess for the reception of a spur formed by a rolling process. Fig. 2 represents a longitudinal central section of the same. Fig. 3 represents a number of bars or blanks from which calks are formed on a gang-drill. Figs. 4, 5, and 6 represent different forms of my improved spur.

The same letters of reference indicate the same parts in all the figures.

In carrying out my invention I make a calk $a$ with a recess or hole $b$ in one side thereof, said hole being adapted to receive the head of a spur $c$. The said hole or recess $b$ may be formed in the calk $a$ in any suitable way—for instance, by rolling the calk between suitable rollers adapted to make such a hole or recess at a suitable point in said calk, thus producing a calk such as is shown in Figs. 1 and 2. I may also form the hole or recess $b$ by drilling a number of bars or blanks being placed on a gang-drill and having a recess or spur-receiving hole drilled in each simultaneously at suitable intervals, as shown in Fig. 4, the drills being arranged to drill a hole or recess in the upper and under sides of each alternate bar, said bars being afterward cut up into suitable lengths for calks, each calk having a hole or recess formed by the drill for the reception of the spur-head. The spurs $c$ may be made by forging or by cutting or in any other suitable manner and are preferably of steel, having a tempered point. The head of the spur $c$ is placed in the recess $b$, and, if desired, may be provided with a suitable cement to hold it temporarily in place. Said spurs may be fixed in said recesses by electric welding or by putting the calk in a press, which compresses the walls of the recess $b$ in said calk upon the head of the spur $c$. The spurs may also be fastened in said recesses by first heating the calk, causing the same to expand, and then driving the head of the spur $c$ into the hole $b$ therein, the contraction of the calk on cooling holding the spur firmly.

By forming the calk with a hole extending but part way through it and then permanently and rigidly securing one end of the spur in said hole the parts become inseparable and may be applied to a shoe by welding in the ordinary way, the chief object of my invention being to provide the calk with a spur that will drive in every instance without bending or breaking, thereby avoiding waste, and to enable toe-calks having such improved spurs to be manufactured in an economical manner, so that they can be sold cheaper than toe-calks made by forging in the usual manner.

I claim—

The improved calk for horseshoes, having a hole formed part way therein and a spur made in a separate piece from said calk and having one end permanently and rigidly secured in said hole, as set forth.

In testimony whereof I have signed my name to this specification, in the presence of two subscribing witnesses, this 14th day of April, A. D. 1891.

THEODORE S. VERY.

Witnesses:
   C. F. BROWN,
   EWING W. HAMLEN.